United States Patent
Bernath et al.

(10) Patent No.: US 11,763,108 B2
(45) Date of Patent: Sep. 19, 2023

(54) RADIO FREQUENCY IDENTIFICATION DISCONTINUITY CORRECTION

(71) Applicant: Toshiba Global Commerce Solutions Holdings Corporation, Tokyo (JP)

(72) Inventors: David Bernath, Durham, NC (US); David Steiner, Raleigh, NC (US); Timothy W. Crockett, Raleigh, NC (US); Jose R. Figueroa, McDonough, GA (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 56 days.

(21) Appl. No.: 17/390,561

(22) Filed: Jul. 30, 2021

(65) Prior Publication Data
US 2023/0033590 A1 Feb. 2, 2023

(51) Int. Cl.
G06K 7/10 (2006.01)
(52) U.S. Cl.
CPC ................ *G06K 7/10366* (2013.01)
(58) Field of Classification Search
CPC ... G06K 7/10366; G06K 7/10; G06K 19/0723
USPC ....................................................... 235/451
See application file for complete search history.

(56) References Cited

U.S. PATENT DOCUMENTS

| | | | | |
|---|---|---|---|---|
| 7,580,378 B2* | 8/2009 | Carrender | ............... | G01S 13/84 370/278 |
| 7,609,163 B2* | 10/2009 | Shafer | ................... | G01S 13/825 340/572.1 |
| 8,493,182 B2* | 7/2013 | Hofer | ..................... | G01S 13/75 340/8.1 |
| 2010/0176921 A1* | 7/2010 | Frederick | ............... | G01S 13/92 340/936 |
| 2011/0187600 A1* | 8/2011 | Landt | ........................ | G01S 3/02 342/458 |
| 2014/0167920 A1* | 6/2014 | Kamiya | .................. | G01S 13/58 340/10.1 |
| 2016/0104013 A1* | 4/2016 | Fessler | .................... | G01S 13/84 340/10.1 |
| 2022/0092281 A1* | 3/2022 | Trivelpiece | ........ | G06K 7/10099 |

* cited by examiner

*Primary Examiner* — Ahshik Kim
(74) *Attorney, Agent, or Firm* — Patterson + Sheridan, LLP

(57) ABSTRACT

Radio frequency identification discontinuity correction is provided by calculating a phase-time slope for a Radio Frequency Identifier (RFID) signal received from an RFID tag; estimating, based on the phase-time slope, a predicted phase reading for the RFID signal at a given time; and in response to detecting a phase discontinuity based on a difference between the predicted phase reading and an actual phase reading for the given time, adjusting a calculated distance to the RFID tag. The calculated distance may indicate that the RFID tag is inside of or outside of a designated zone, and that a motion of the RFID tag indicates travel towards or away from the designated zone, which may be used to add or remove an item associated with the RFID tag to an ongoing item list.

17 Claims, 5 Drawing Sheets

RADIO FREQUENCY IDENTIFICATION DISCONTINUITY CORRECTION

BACKGROUND

The present invention relates to Radio Frequency Identification (RFID), and more specifically, to reading RFID tags that are in motion. When energized, an RFID tag produces a radio signal that can be used to identify the RFID tag (and thereby an associated object) at a distance and without physical contact via an RFID reader. However, depending on the velocity of the RFID tag relative to the RFID reader, the radio signal may experience a discontinuity or otherwise become corrupted, and the RFID reader may misidentify the RFID tag or be unable to identify the RFID tag.

SUMMARY

According to one embodiment of the present invention, a method for radio frequency identification discontinuity correction is provided, the method comprising: calculating a phase-time slope for a Radio Frequency Identifier (RFID) signal received from an RFID tag; estimating, based on the phase-time slope, a predicted phase reading for the RFID signal at a given time; and in response to detecting a phase discontinuity based on a difference between the predicted phase reading and an actual phase reading for the given time, adjusting a calculated distance to the RFID tag.

According to one embodiment of the present invention, a system for radio frequency identification discontinuity correction is provided, the system, comprising: a processor; a memory including instructions that when executed by the processor enable the processor to perform operations comprising: calculating a phase-time slope for a Radio Frequency Identifier (RFID) signal received from an RFID tag; estimating, based on the phase-time slope, a predicted phase reading for the RFID signal at a given time; and in response to detecting a phase discontinuity based on a difference between the predicted phase reading and an actual phase reading for the given time, adjusting a calculated distance to the RFID tag.

According to one embodiment of the present invention, a non-transitory computer-readable storage medium including instructions for radio frequency identification discontinuity correction is provided, that when executed by a processor enable the processor to: calculate a phase-time slope for a Radio Frequency Identifier (RFID) signal received from an RFID tag; estimate, based on the phase-time slope, a predicted phase reading for the RFID signal at a given time; and in response to detecting a phase discontinuity based on a difference between the predicted phase reading and an actual phase reading for the given time, adjust a calculated distance to the RFID tag.

DETAILED DESCRIPTION

Radio Frequency Identification (RFID) tags are increasingly being deployed in scenarios requiring ever greater locational precision. Accordingly, merely identifying the presence of an RFID tag within the range of an RFID reader may be insufficient for the intended goals of an end user, and various ranging functions are desired in addition to a presence indicator. By expanding the functionality of the RFID reader to include a ranging function in addition to presence identification functions, the RFID reader can provide greater specificity for whether an item is in a given area, entering a given area, or leaving a given area. For example, when a ranging-capable RFID reader is deployed in a self-checkout kiosk, the RFID reader can identify whether the user has placed an item in a checkout zone, a packing zone, returned an inadvertently scanned item to a return zone, distinguish between items being scanned in closely placed kiosks, etc., when accurate distance determinations are available to the RFID reader.

However, when moving RFID tagged items in and out of designated zones, the movement can cause phase discontinuities in the locational data. Unless tracked and corrected for, these discontinuities can introduce ambiguity in the location of the RFID tagged items, which can render a calculated distance inaccurate or unusable. Accordingly, the present disclosure provides for the correction of these discontinuities to thereby improve the functionality and accuracy of RFID readers. When using the methodologies of the present disclosure, an RFID reader can advantageously calculate the distance to items that are in in motion (or while the RFID is in motion when identifying items) when such identification would otherwise be impractical or inaccurate.

For example, when the present disclosure is implemented in a package sorting facility, the speed at which mechanical conveyors can be increased while still producing accurate locational determinations for packages tracked with RFID tags.

Figure 1:
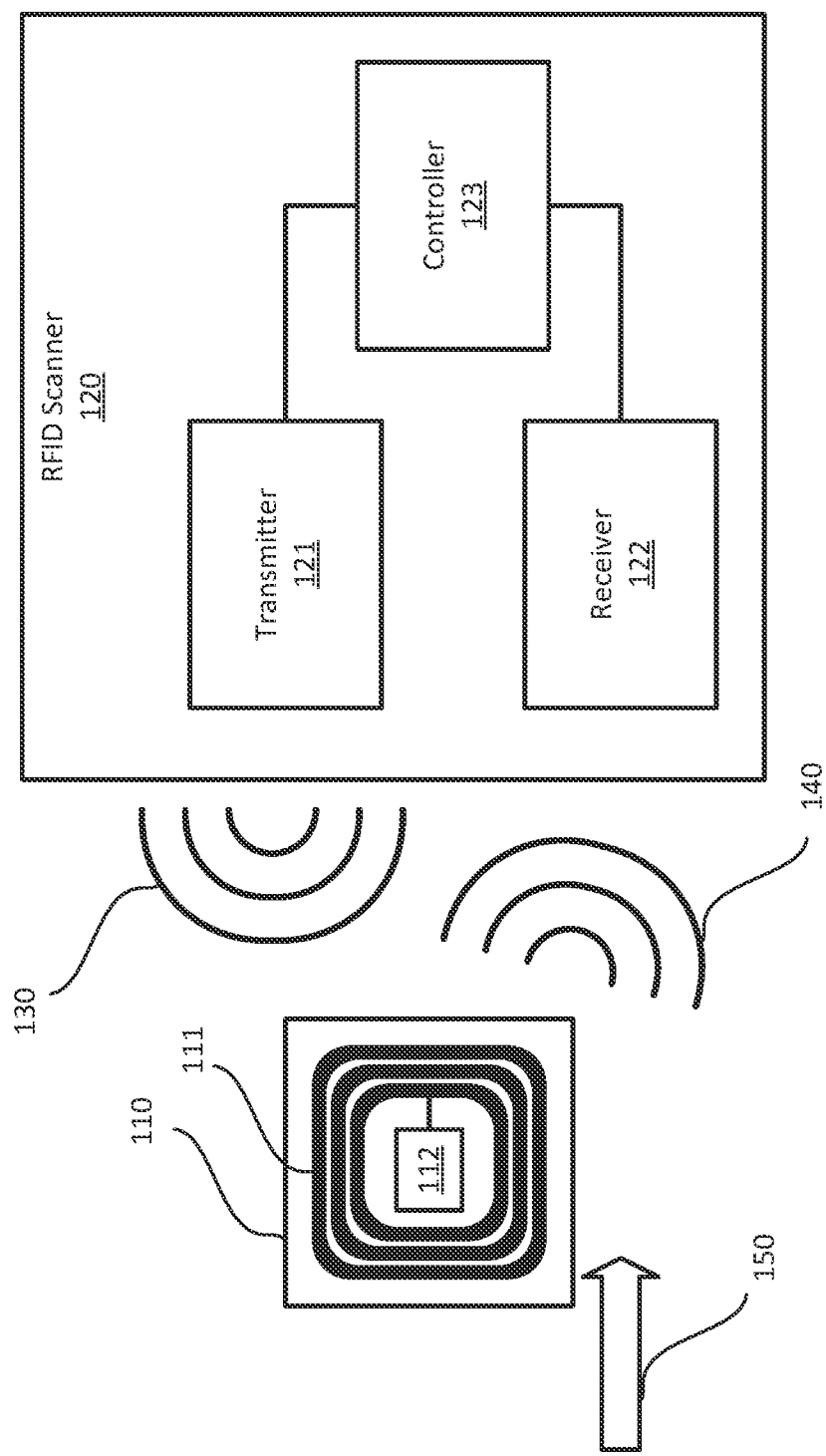
FIG. 1 illustrates an RFID scanning environment, according to aspects of the present disclosure.

FIG. 1 illustrates a passive RFID tag 110 interacting with an RFID reader 120, according to embodiments of the present disclosure. The RFID tag 110 receives an energizing signal 130 from the RFID reader 120 and in response, generates an RFID signal 140 that identifies the RFID tag 110 (and an associated object) to the RFID reader 120.

The RFID tag 110 includes an antenna 111 to receive the energizing signal 130, and as a passive device, uses the power provided by the energizing signal 130 to produce the RFID signal 140. A memory 112 included in the RFID tag 110 imparts an identifier on the RFID signal 140 so that the RFID reader 120 can distinguish between different RFID tags 110 being tracked at the same time, and to identify particular RFID tags 110. For example, an RFID tag 110 associated with a can of peas imparts a different identifier than an RFID tag 110 associated with a bottle of soda, to allow the RFID reader 120 to identify when the can of peas is present versus the bottle of soda. Similarly, the identifier can include a class identifier (e.g., peas versus soda) and a member identifier to distinguish and track two or more members of the same class (e.g., a first can of peas versus a second can of peas). In various embodiments, the identifiers are associated with a particular environment and can include various levels of detail that can be cross-referenced by the RFID reader 120 to a database to look up identities, pricing information, age information, routing data, consumer safety data, or the like.

The RFID reader 120 includes a transmitter 121 to generate one or more energizing signals 130 and a receiver 122 to receive one or more RFID signals 140. A controller 123 included in the RFID reader 120 controls when the transmitter transmits the energizing signals 130, and interprets the RFID signals 140 received by the receiver 122. In various embodiments, the controller 123 interprets the identifier value from the received RFID signal 140. The controller 123 may provide the identity read from the RFID signal 140 with one or more computing devices in communication with the RFID reader 120 (e.g., a self-checkout kiosk, a mobile phone, a digital assistant device, a shipping or warehousing controller) for cross-referencing and displaying identity and other data to human users, or controlling various automated equipment based on the identity of the RFID tag 110. In various embodiments, the controller 123 is in communication with, or included in, a computing device 500 as is described in greater detail in regard to FIG. 5.

In addition to reading the identity data from the RFID signal 140, the controller 123 also determines the distance between the RFID reader 120 and the RFID tag 110 based phase differences (Δϕ) between the two signals. The energizing signal 130 and (by extension) the RFID signal 140 are Continuous Wave (CW) signals that use a carrier wave (e.g., as a sine wave) to energize the RFID tag 110 and carry the identifier information back to the RFID reader 120. The RFID reader 120 can determine the relative distance between the RFID tag 110 and the RFID reader 120 based on the wavelength of the carrier signal and the phase difference traveled by the wave (e.g., ϕλ/360). This phase difference can be correlated to a known distance between the RFID tag 110 and RFID reader 120, which the controller 123 tracks with discontinuity correction according to method 300 to thereby track an identified item in space.

When the RFID tag 110 is stationary, the phase difference between the energizing signal 130 and the RFID signal 140 remains constant. However, as the RFID tag 110 moves relative to the RFID reader 120, the movement 150 of the RFID tag 110 affects the phase difference; either increasing the phase difference when decreasing the distance to the RFID reader 120 (e.g., "moving towards") or decreasing the phase difference when increasing the distance to the RFID reader 120 (e.g., "moving away"). However, as the phase of a sine wave is a cyclical measurement, with 0 degrees and 180 degrees being indistinguishable from one another, phase discontinuities across the crossing-point of 0/180 degrees may render the location of the RFID tag 110 relative to the RFI reader 120 ambiguous. As will be appreciated, these discontinuities continue across multiples of 180 degrees (in both the positive and negative directions), rendering measurements at . . . −360, −180, 0, 180, 360, . . . and any integer multiple of 180 indistinguishable from one another without appropriate tracking and correction.

Depending on the hardware or methodology used to measure the phase differences, the discontinuities can instead occur at integer multiples of 360 degrees. Accordingly, although generally discussed with measurements calculated with an absolute phase value (where a phase difference of −x and +x appear equivalent) and discontinuities occur every 180 degrees, other embodiments can use signed phase differences, in which discontinuities occur every 360 degrees.

Figure 2A:
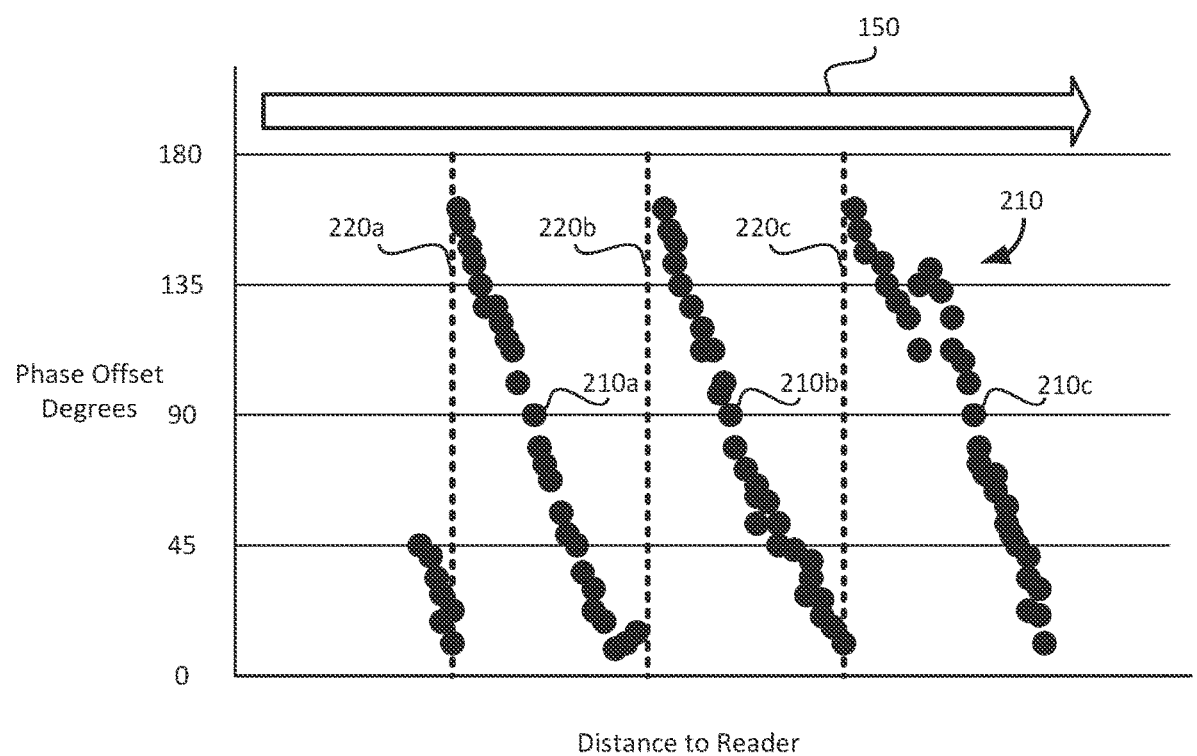
FIGS. 2A-2B illustrate phase measurements of an RFID signal, according to aspects of the present disclosure.
Figure 2B:
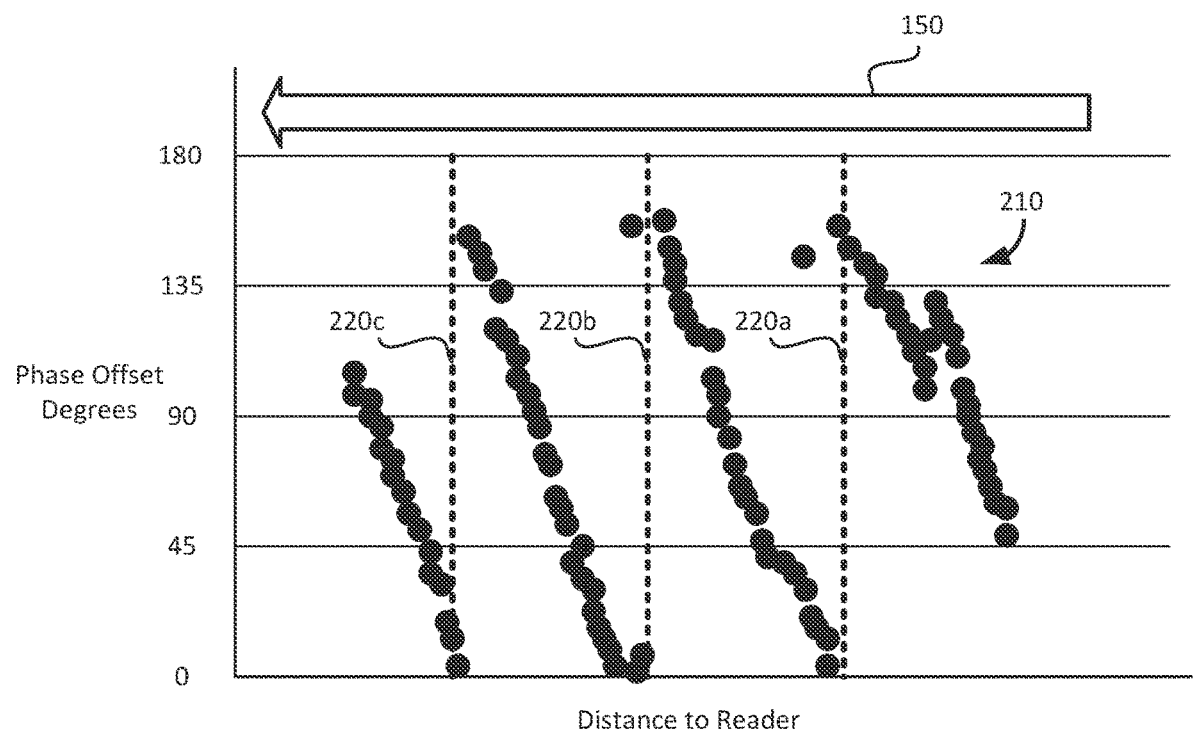

FIGS. 2A-2B illustrate phase measurement graphs, according to embodiments of the present disclosure. FIGS. 2A-2B plot several discrete measurements 210 (shown as circles) taken at different distances between an RFID tag 110 and an RFID reader 120 which are correlated to the different distances (on the x-axis) based on the phase of the received RFID signal 140 (on the y-axis). Each of the measurements 210 are taken at different times as the RFID tag 110 experiences movement 150 relative to the RFID reader 120.

Although generally discussed as the movement 150 "of the RFID tag 110", the movement 150 may refer to any relative movement between the RFID tag 110 and the RFID reader 120, which can include one or both of the RFID tag 110 and the RFID reader 120 moving. Additionally, the movement 150 may occur in three dimensions and with rotation on various axes (e.g., according six degrees of freedom). The movement 150 may be the result of various forces (e.g., human, mechanical, or environmental) acting directly or indirectly on the RFID tag 110 (or an item to which the RFID tag 110 is attached) or directly or indirectly on the RFID reader 120. For example, a conveyor belt or gravity-assisted roller can move an item that the RFID tag 110 is affixed to, while a human can move the RFID reader 120 in the environment. In another example, a human can move an item that the RFID tag 110 is affixed to relative to a stationary RFID reader 120. In a further example, a human or a robot can move an RFID reader 120 in a warehouse that stores stationary items with affixed RFID tags 110.

FIG. 2A illustrates movement 150 of the RFID tag 110 towards the RFID reader 120, while FIG. 2B illustrates movement 150 of the RFID tag 110 away from the RFID reader 120. Regardless of how the movement 150 between the RFID tag 110 and the RFID reader 120 is imparted, or the direction of the movement 150, a change in the received phase of the RFID signal 140 correlates to change in distance between the devices. However, as phase measurements are cyclical, several different distances correlate to the same phase offset.

For example, a first measurement 210a, a second measurement 210b, and a third measurement 210c in FIG. 2A all indicate a phase offset of 90 degrees, but are correlated with different distances between the RFID tag 110 and the RFID reader 120. Taken in isolation, these measurements 210a-c all indicate the same phase offset, but if tracked relative to an initial phase offset, these phase offsets can instead be interpreted to be the measured phase offset (e.g., 90 degrees) plus or minus a multiple of a phase discontinuity 220a-c (generally or collectively, phase discontinuity 220). A phase discontinuity 220 describes a cross-over in the phase offset correlation to the distance, which occurs at the 0 to 180 (or 180 to 0) degree change-over point in measuring the phase offset. For example, the first measurement 210a occurs at 90 degrees from an initial phase offset, the second measurement 210b occurs at 270 (e.g., 90+180) degrees from the initial phase offset, and the third measurement 210c occurs at 450 (e.g., 90+360) degrees, etc. The distance between the phase discontinuities 220 is equal to half the wavelength of the carrier signal being measured. For example, using a 2200 Megahertz (MHz) carrier signal propagating at the speed of light, the wavelength would be approximately 136 millimeters (mm), and the step distance between phase discontinuities 220 would be approximately 68 mm.

In FIG. 2A the first phase discontinuity 220a occurs the first time that the phase offset measurement crosses the change-over point due to the movement 150 of the RFID 110 tag, and indicates that the following measurements 210, although are to be interpreted as the initial measured phase offset plus the distance covered by the wave in 180 degrees from the initial phase reading. Similarly, the second phase discontinuity 220b occurs the second time that the phase offset measurement crosses the change-over point, which indicates that the following measurements 210 are to be interpreted as the initial measured phase offset plus the distance covered by the wave in 360 degrees from the initial phase reading. Accordingly, the third phase discontinuity 220c occurs the third time that the phase offset measurement crosses the change-over point, which indicates that the following measurements 210 are to be interpreted as the initial measured phase offset plus the distance covered by the wave in 540 degrees from the initial phase reading. Accordingly, a distance originally measured at 90 degrees of 30 mm from the RFID reader 120 would be interpreted at the first measurement 210a as roughly 98 mm from the RFID reader 120 (e.g., 30 mm+68 mm), at the second measurement 210b as roughly 166 mm (e.g., 30 mm+68 mm+68 mm) from the RFID reader 120, etc.

In FIG. 2B the first phase discontinuity 220a occurs the first time that the phase offset measurement crosses the change-over point due to the movement 150 of the RFID 110 tag, and indicates that the following measurements 210, are to be interpreted as the initial measured phase offset minus the distance covered by the wave in 180 degrees from the initial phase reading. Similarly, the second phase discontinuity 220b occurs the second time that the phase offset measurement crosses the change-over point, which indicates that the following measurements 210 are to be interpreted as the initial measured phase offset minus the distance covered by the wave in 360 degrees from the initial phase reading. Accordingly, the third phase discontinuity 220c occurs the third time that the phase offset measurement crosses the change-over point, which indicates that the following measurements 210 are to be interpreted as the initial measured phase offset minus the distance covered by the wave in 540 degrees from the initial phase reading.

By tracking the phase discontinuities 220 experienced across the measurements 210, the RFID reader 120 can identify the different locations associated with two or more individual measurements (e.g., measurements 210a-c) that indicate the same phase offset.

Figure 3:
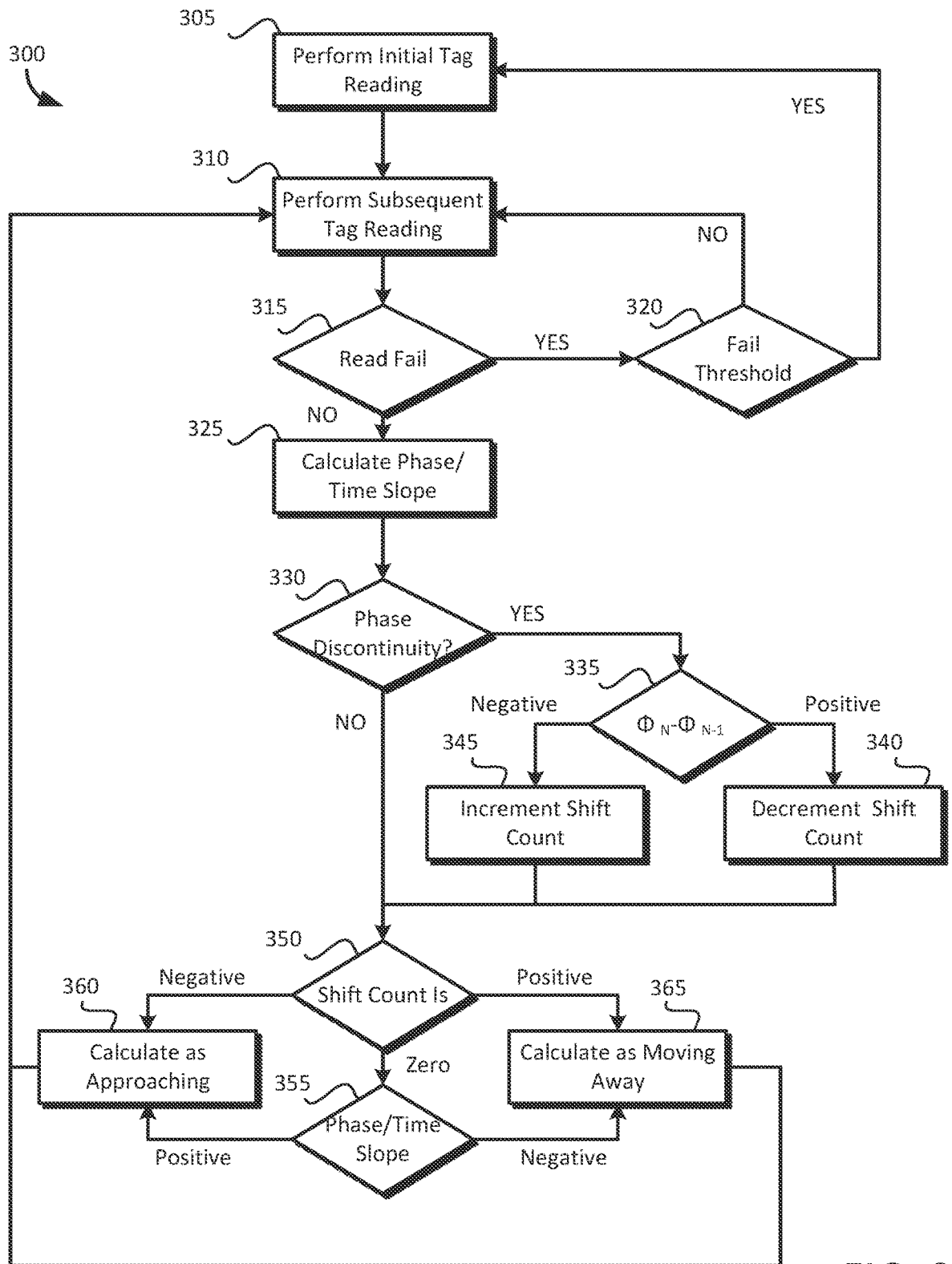
FIG. 3 is a flowchart of a method for identifying and correcting phase discontinuities in an RFID signal, according to aspects of the present disclosure.

FIG. 3 is a flowchart of a method 300 for correcting discontinuities in RFID signals, according to embodiments of the present disclosure. Method 300 begins at block 305 where the RFID reader 120 performs an initial tag read of a given RFID tag 110. The initial tag read occurs at time t0 to identify an initial phase reading (e.g., $\phi_0$) for the given RFID tag 110. The RFID reader 120 transmits the energizing signal 130 and receives the RFID signal 140, and interprets the identifier included thereon for a given RFID tag 110. In various embodiments, the initial tag reading of one RFID tag 110 can be performed at the same or a different time as initial tag readings for other RFID tags 110. Stated differently, the RFID reader 120 may perform several instances of method 300 in parallel for simultaneously reading and tracking several RFIDs 110, where the instances of block 305 are performed in parallel (e.g., using a shared time $t_0$), but may also perform one or more instances of block 305 out of sync with other instances of block 305 (e.g., time $t_0$ for a first instance≠time $t_0$ for a second instance).

At block 310, the RFID reader 120 performs a subsequent tag reading at a subsequent time $t_n$ to identify a subsequent phase reading (e.g., $\phi_n$). Ideally, the RFID reader 120 transmits the energizing signal 130, receives the RFID signal 140, and interprets the identifier included thereon for a given RFID tag 110 for time $t_n$, but due to environmental interference and other communications errors, a responsive RFID signal 140 may not always be received for a next time period relative to a prior time period. Accordingly, method 300 proceeds to block 315, where the RFID reader 120 determines whether a read fail has occurred in the subsequent tag reading (per block 310). A read fail may occur when no RFID signal 140 is received at an expected time $t_n$, or when the RFID signal 140 received at time $t_n$ includes an identifier that does not match a previously received identifier, satisfy a checksum, or the like.

When the RFID reader 120 determines at block 315 that a read fail has not occurred, method 300 proceeds to block 325. Otherwise, when the RFID reader 120 determines at block 315 that a read fail has occurred, method 300 proceeds to block 320.

At block 320, the RFID reader 120 determines whether a fail threshold has been reached for reading a given RFID tag 110. In various embodiments, the fail threshold can identify a threshold number of read fails or threshold amount of time between receiving successful tag readings. For example, for a fail threshold of five readings, if the RFID reader 120 performed a last-good tag reading at time tn, the RFID reader 120 attempts to perform subsequent readings at times $t_{n+1}$, $t_{n+2}$, $t_{n+3}$, $t_{n+4}$, and $t_{n+5}$ by returning to block 310 when the fail threshold is not met. However, the RFID reader 120 restarts (or concludes) method 300 by returning to block 305 instead of attempting to perform a subsequent reading at time $t_{n+6}$ (per block 310) once the fail threshold is reached.

At block 325, the RFID reader 120 calculates a phase/time slope using the tag readings. Because movement of the RFID tag 110 in the environment relative to the RFID reader 120 affects the phase readings, and movement may be erratic or subject to measurement errors, the RFID reader 120 calculates the phase/time slope using the two latest good measurements (e.g., $\phi_n$ from $t_n$ and $\phi_{n-1}$ from $t_{n-1}$). For example, if a person holding an item to which the RFID tag 110 is attached moves the item back and forth, the direction of movement 150 (and therefore the phase/time slope) will change over time (e.g., positive from time $t_0$-$t_n$ and negative from time $t_n$-$t_{n+1}$), which is reflected by calculating the phase/time slope from subsequent measurements. The phase/time slope is calculate as the change in phase over the change in time (e.g., m=$\Delta\phi/\Delta t$).

In various embodiments, such as when a read failure occurred (per block 315), the subsequent tag readings used to calculate the phase/time slope need not be immediately subsequent. For example, the RFID reader 120 can calculate the phase/time slope using $\phi_1$ from $t_1$ and $\phi_3$ from $t_3$ when a valid tag reading for $\phi_2$ from $t_2$ was not received.

At block 330, the RFID reader 120 determines whether a phase discontinuity has occurred between the two readings used to calculate the phase/time slope (e.g., $m_n=(\phi_n-\phi_{n-1})/(t_n-t_{n-1})$). In various embodiments, the RFID reader 120 uses a discontinuity threshold for a number of degrees change between the readings to indicate that a phase discontinuity has occurred. For example, if the absolute difference between $\phi_n$ and $\phi_{n-1}$ is greater than X degrees, the RFID reader 120 determines that a phase discontinuity has occurred (e.g., when $|\phi_n-\phi_{n-1}|>X$). In various embodiments, the value of the discontinuity threshold (X) is set such that the movement 150 of the RFID tag 110 is not expected to be fast enough to result in a change of phase reading greater than the discontinuity threshold without crossing the cross-over point (e.g., X=100 degrees). When the RFID reader detects that a phase discontinuity has occurred, method 300 proceeds to block 335 Otherwise, when the RFID reader has not detected a phase discontinuity, method 300 proceeds to block 350.

At block 335, the RFID reader 120 determines the direction of relative movement 150 between the RFID tag 110 and the RFID reader 120. In some embodiments, the RFID reader measures whether the difference between $\phi_n - \phi_{n-1}$ is positive or negative, indicating movement away or movement towards the RFID reader 120, respectively, by the RFID tag 110.

In some embodiments, as part of determining whether a phase discontinuity has occurred (per block 330) and the direction of movement (per block 335), the RFID reader 120 can calculate an predicted phase (p$\phi$) reading based on the previous phase reading and the previously calculated phase/time slope (e.g., $p\phi_n = \phi_{n-1} + m_{n-1}*(t_n - t_{n-1})$) and compare the predicted phase for time $t_n$ against the actual phase reading for time $t_n$ to determine phase error (e$\phi$) for time $t_n$ (e.g., $e\phi_n = p\phi_n - \phi_n$). When the phase error is less than or equal to zero and the absolute value of the phase error is less than the absolute value of cross-over point and the phase error (e.g., $e\phi_n \leq 0$ and $|e\phi_n| < |180 + e\phi_n|$), method 300 proceeds to block 345. When the phase error is greater than zero and the absolute value of the phase error is less than the absolute value of cross-over point minus the phase error (e.g., $e\phi_n > 0$ and $|e\phi_n| < |180 - e\phi_n|$), method 300 proceeds to block 340. Otherwise method 300 proceeds to block 350.

Accordingly, method 300 proceeds to block 340 when the RFID tag 110 is moving towards the RFID reader 120, where the RFID reader 120 decrements a running shift count, or proceeds to block 345 when the RFID tag 110 is moving away from the RFID reader 120, where the RFID reader 120 increments the running shift count. In one embodiment, the running shift count initializes with a count of zero, but as phase discontinuities occur over time, the RFID reader 120 creates a running record. For example, when the RFID tag 110 experiences a first phase discontinuity at time $t_n$ when moving towards the RFID reader 120 (e.g., when $\phi_n - \phi_{n-1}$ is positive), the running shift count is set to −1, and is set to −2 (i.e., decrementing from −1) when the RFID tag 110 experiences a second phase discontinuity at time $t_{n+1}$ when continuing to move towards the RFID reader 120. However, if the RFID tag experiences a third phase discontinuity at time $t_{n+2}$ when moving away from the RFID reader 120 (e.g., when $\phi_n - \phi_{n-1}$ is negative), the running shift count is set to −1 (i.e., incrementing from −2). Method 300 proceeds to block 350 after block 340 or block 345.

At block 350, the RFID reader 120 determines how to calculate the location of the RFID tag 110 relative to the RFID reader 120 based on the value of the running shift count. When the value of the running shift count is zero, method 300 proceeds to block 355. When the value of the running shift count is negative, method 300 proceeds to block 360. When the value of the running shift count is positive, method 300 proceeds to block 365.

At block 355, the RFID reader 120 determines whether the RFID tag 110 is moving towards or away from the RFID reader 120 based on the value of the phase/time slope. When the phase/time slope is negative, method 300 proceeds to block 365. When the phase/time slope is positive, method 300 proceeds to block 360.

At block 360, the RFID reader 120 calculates the location of the RFID tag 110 relative to the RFID reader 120 as the RFID tag 110 is approaching the RFID reader 120. In various aspects, the phase of the latest good phase reading ($\phi_n$) is adjusted based on the running shift count (e.g., from $\phi_n$ to $\phi_n$+count*180) and the distance between the RFID reader 120 and the RFID tag 110 is calculated.

In various embodiments, the RFID reader 120 calculates the distance to the RFID tag 110 when moving towards the RFID reader 120 based on an initial distance (e.g., the last known distance when the RFID tag 110 was way from the RFID reader 120 or a maximum readable distance from the RFID reader 120) plus the value of the running shift counter multiplied by wavelength of the RFID signal 140. In some embodiments, the initial distance is based on one or more of a signal strength of the RFID signal 140 (e.g., correlating amplitude to distance), a time difference between initial transmission of the energizing signal 130 and initial receipt of the RFID signal 140, and a predetermined "in-range" distance for when the RFID reader 120 can first detect the RFID signal 130.

For example, when an RFID tag 110 has an initial distance ($d_i$) of 1000 mm from the RFID reader 120, the running shift count (C) is negative two (−2), and the RFID signal has a wavelength of 136 mm (using a 2200 MHz frequency carrier) and therefore a discontinuity step size (S) of approximately 68 mm, the RFID reader can calculate the current distance to be according to $d_i + C*S$ (e.g., 1000 mm + −2*68 mm) to be 864 mm away from the RFID reader 120.

In various embodiments, when the distance indicates that the RFID tag 110 is outside of a designated zone but within a proximity threshold of the designated zone of distance from the RFID reader 120 (e.g., between X mm and Y mm from the RFID reader 120), and that a motion of the RFID tag 110 indicates travel towards the designated zone (e.g., approaching Y mm), the RFID reader 120 can indicate that the an item associated with the RFID tag 110 should be tracked via an ongoing item list. For example, a user moving an item associated with an RFID tag 110 towards a checkout zone may have that item added to a transaction register once the item enters the checkout zone, or a package moving through a mail sorting machine is added to an "out for delivery" list when an RFID tag 110 associated with the package is detected as moving onto a delivery vehicle.

At block 365, the RFID reader 120 calculates the location of the RFID tag 110 relative to the RFID reader 120 as the RFID tag 110 is moving away from the RFID reader 120. In various aspects, the phase of the latest good phase reading ($\phi_n$) is adjusted based on the running shift count (e.g., from $\phi_n$ to $\phi_n$+count*180) and the distance between the RFID reader 120 and the RFID tag 110 is calculated.

In various embodiments, the RFID reader 120 calculates the distance to the RFID tag 110 when moving away based on an initial distance (e.g., the last known distance when the RFID tag 110 was moving towards the RFID reader 120 or zero) plus the value of the running shift counter multiplied by wavelength of the RFID signal 130. For example, when an RFID tag 110 has an initial distance ($d_i$) of 10 mm from the RFID reader 120, the running shift count (C) is positive two (+2), and the RFID signal has a wavelength of 136 mm (using a 2200 MHz frequency carrier) and therefore a discontinuity step size (S) of approximately 68 mm, the RFID reader can calculate the current distance to be according to $d_i + C*S$ (e.g., 10 mm + 2*68 mm) to be 146 mm away from the RFID reader 120.

In various embodiments, when the distance indicates that the RFID tag 110 is inside and moving outside of a designated zone of the designated zone of distance from the RFID reader 120 (e.g., between 0 mm and Y mm from the RFID reader 120), and that a motion of the RFID tag 110 indicates travel away from the designated zone (e.g., approaching Y mm), the RFID reader 120 can indicate that the item associated with the RFID tag 110 should no longer be tracked via an ongoing item list. For example, a user moving an item associated with an RFID tag 110 away a checkout zone in an opposite direction from the direction that the item was moved into the checkout zone by may have that item removed from a transaction register once the item leaves the checkout zone (e.g., as an inadvertently scanned item). In another example, a user moving an item associated with an RFID tag 110 away a checkout zone in a same direction to the direction that the item was moved into the checkout zone by may have that item removed from the transaction register and added to a packing area list (e.g., as an intended scanned item to verify for loss prevention purposes).

Method 300 returns to block 310 after block 360 or block 365 to continue correcting discontinuities in RFID signals as the RFID reader 120 tracks the RFID tag 110.

Figure 4:
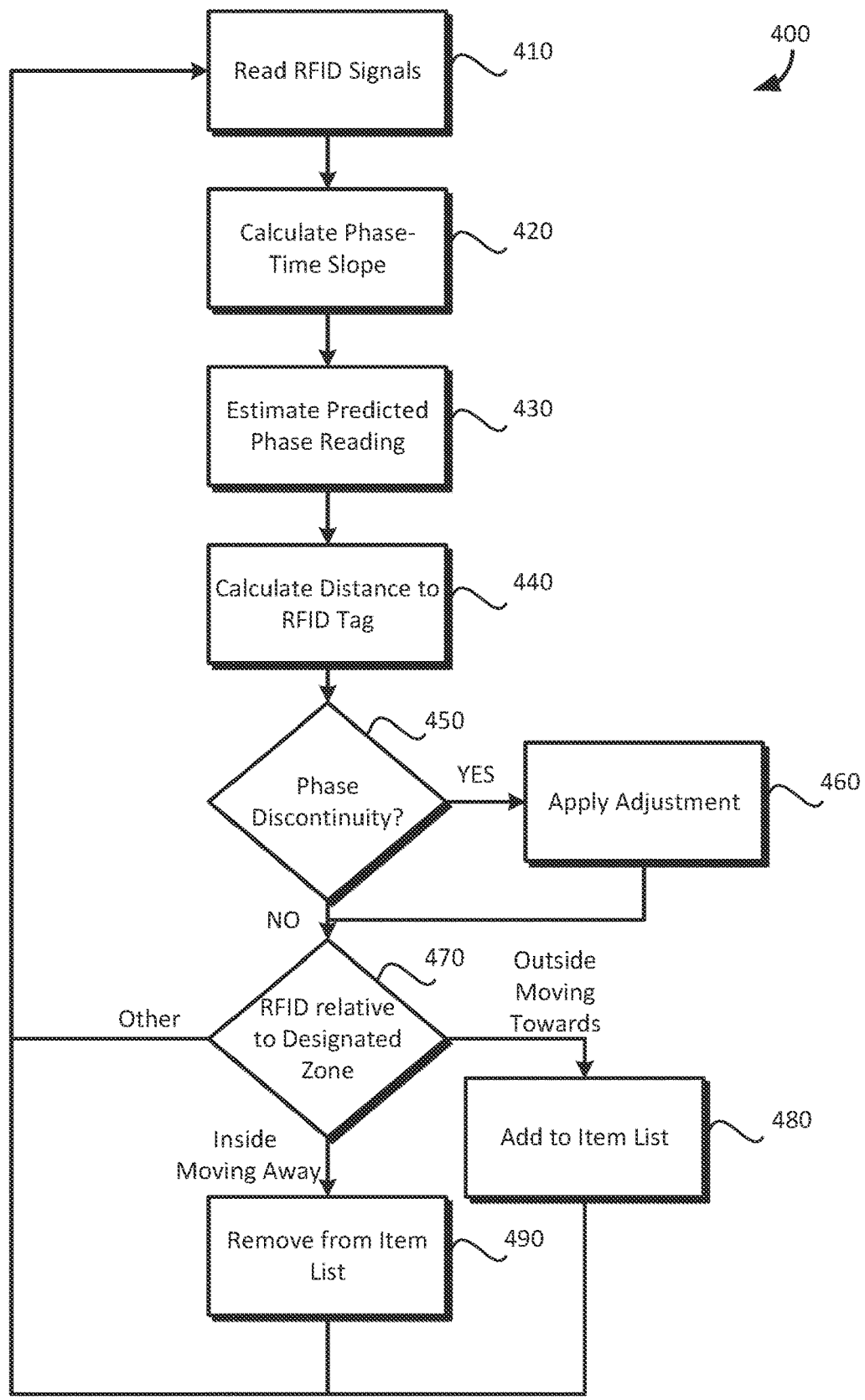
FIG. 4 is a flowchart of a method for correcting discontinuities in RFID signals, according to embodiments of the present disclosure.

FIG. 4 is a flowchart of a method 400 for correcting discontinuities in RFID signals, according to embodiments of the present disclosure. Method 400 provides a complementary understanding of method 300 presented in relation to FIG. 3. Method 400 begins at block 410, where the RFID reader 120 reads the RFID signals 130 emanated from an RFID tag 110. In various embodiments, the RFID reader 120 can read separate RFID signals 130 from several RFID tags 110 at one time, and a corresponding number of iterations of method 400 may be performed in parallel to track the several RFID tags 110. As will be appreciated, the different iterations of method 400 may be formed at different start and end times for individual RFID tags 110 and, as such, the individual operations of the several iterations method 400 may be performed at different times to one another.

At block 420, the RFID reader 120 calculates a phase-time slope based on two readings of the RFID signals 140 taken at different times from a given RFID tag 110. The change in phase over the change in time from these two readings defines the phase-time slope (e.g., $m=\Delta\phi/\Delta t$). Although consecutive readings can be used, the RFID reader 120 can also account for read errors by using non-consecutive readings including a last-good reading and a previous last-good reading (e.g., $\Delta\phi=\phi_x-\phi_{x-y}$ for $\Delta t=t_x-t_{x-y}$ where $1 \leq y <$ a read fail threshold).

At block 430, the RFID reader 120 estimates a predicted phase reading ($p\phi$) for a subsequent time. Using the calculated phase-time slope, the RFID reader 120 extrapolates the phase reading ($\phi_x$) from the current time ($t_x$) to one or more future times (e.g., $t_{x+y}$, where $1 \leq y <$ a read fail threshold) to estimate that $p\phi_x=m(t_{x+y}-t_x)+\phi_x$. As will be appreciated, unlike the phase measurements that reset across the phase discontinuity boundary (e.g., 5 degrees instead of 185 degrees), the predicted phase reading maintain information across the boundary. For example, when the phase-time slope indicates that the current phase (of 175 degrees) at time $t_x$ is expected to increase by 10 degrees by time $t_{x+1}$, the predicted phase reading for time $t_{x+1}$ is equal to 185 degrees, not 5 degrees. Similarly, when the phase-time slope indicates that the current phase (of 5 degrees) at time $t_x$ is expected to decrease by 10 degrees by time $t_{x+1}$, the predicted phase reading for time $t_{x+1}$ is equal to −5 degrees, not 175 degrees.

At block 440, the RFID reader 120 calculates a distance to the RFID tag 110 based on the tracked phase readings. The measured change in phase is correlated to a change in distance from the last known distance at the last known phase reading. In various embodiments, an initial distance, from which later distances are tracked is based on one or more of a signal strength of the RFID signal 140 (e.g., correlating amplitude to distance), a time difference between initial transmission of the energizing signal 130 and initial receipt of the RFID signal 140, and a predetermined "in-range" distance for when the RFID reader 120 can first detect the RFID signal 130. In subsequent iterations of block 440 (e.g., as the RFID reader 120 continues to track the location of the RFID tag 110) the initial distance that the new distance is calculated from is based on the previously calculated distance, including any adjustments made thereto in the previous iterations.

At block 450, the RFID reader 120 determines whether a phase discontinuity has been detected based on a difference between the predicted phase reading and an actual phase reading for the given time. As the phase reading is predicted to change based on the location of the RFID tag 110, comparing a phase error ($e\phi$) between the predicted and actual phase readings for a given time can identify discontinuities when the difference is above a discontinuity threshold, assuming that the RFID tag 110 is not subject to accelerations that would change the velocity thereof beyond the discontinuity threshold. Stated differently, if the phase error between the predicted and actual phase readings for time $t_x$ is below the discontinuity threshold ($\text{Th}_{discontinuity}$), the phase-time slope (m) accurately reflects the motion of the RFID tag 110 (plus or minus measurement errors, accounted-for acceleration ranges, etc.). However, if the predicted and actual readings lie across a phase-discontinuity boundary the measured phase difference may not account for the phase boundary. Because the predicted phase value maintains phase information across the phase-discontinuity boundary, while the measured value does not, a measurement across the phase-discontinuity boundary results in a large phase error. Accordingly, when $|p\phi_x-\phi_x|>\text{Th}_{discontinuity}$, the RFID reader 120 detects a phase discontinuity. In various embodiments, $\text{Th}_{discontinuity}$ is set to 100 degrees, but other values can be set based on the permitted accelerations that are commensurate with the change in phase for $\text{Th}_{discontinuity}$.

When a phase discontinuity is detected, method 400 proceeds to block 460, whereas when no phase discontinuity is detected, method 400 proceeds to block 470.

At block 460, the RFID reader 120 applies an adjustment to the distance calculated in block 440. In various embodiments, depending on the sign of the phase error ($e\phi$), the RFID reader 120 tracks a step towards or a step away from the RFID reader 120 to add or subtract half a wavelength to the calculated distance. The number (and direction) of steps to apply to the distance adjustment are tracked in a running shift count by the RFID reader 120 so that over multiple iterations of method 400, the discontinuities identified by the RFID reader 120 consistently affect the calculated distance. Depending on the direction of the phase error, the shift count may be incremented or decremented to account for the direction of movement of the RFID tag 110 relative to the RFID reader 120.

At block 470, the RFID reader 120 determines where the RFID tag 110 is located relative to a designated zone in the environment and the relative motion of the RFID tag 100 to that designated zone. When the RFID tag 110 is determined to be located outside of the designated zone, but is moving towards the designated zone, method 400 proceeds to block 480. When the RFID tag 110 is determined to be located inside of the designated zone and is moving out of the designated zone, method 400 proceeds to block 490. Otherwise, method 400 returns to block 410 to take additional readings of the RFID signals 130 or concludes when the RFID tag 110 moves out of range of the RFID reader 120.

At block 480, the RFID reader 120 adds an item associated with the RFID tag 110 to an ongoing item list. For example, a user moving an item associated with an RFID tag 110 towards a checkout zone may have that item added to a transaction register once the item enters the checkout zone, or a package moving through a mail sorting machine is added to an "out for delivery" list when an RFID tag 110 associated with the package is detected as moving onto a delivery vehicle. Method 400 may then return to block 410 to take additional readings of the RFID signals 130 or conclude when the RFID tag 110 moves out of range of the RFID reader 120.

At block 490, the RFID reader 120 removes an item associated with the RFID tag 110 from an ongoing item list. For example, a user moving an item associated with an RFID tag 110 away a checkout zone in an opposite direction from the direction that the item was moved into the checkout zone by may have that item removed from a transaction register once the item leaves the checkout zone (e.g., as an inadvertently scanned item). In another example, a user moving an item associated with an RFID tag 110 away a checkout zone in a same direction to the direction that the item was moved into the checkout zone by may have that item removed from the transaction register and added to a packing area list (e.g., as an intended scanned item to verify for loss prevention purposes). Method 400 may then return to block 410 to take additional readings of the RFID signals 130 or conclude when the RFID tag 110 moves out of range of the RFID reader 120.

Figure 5:
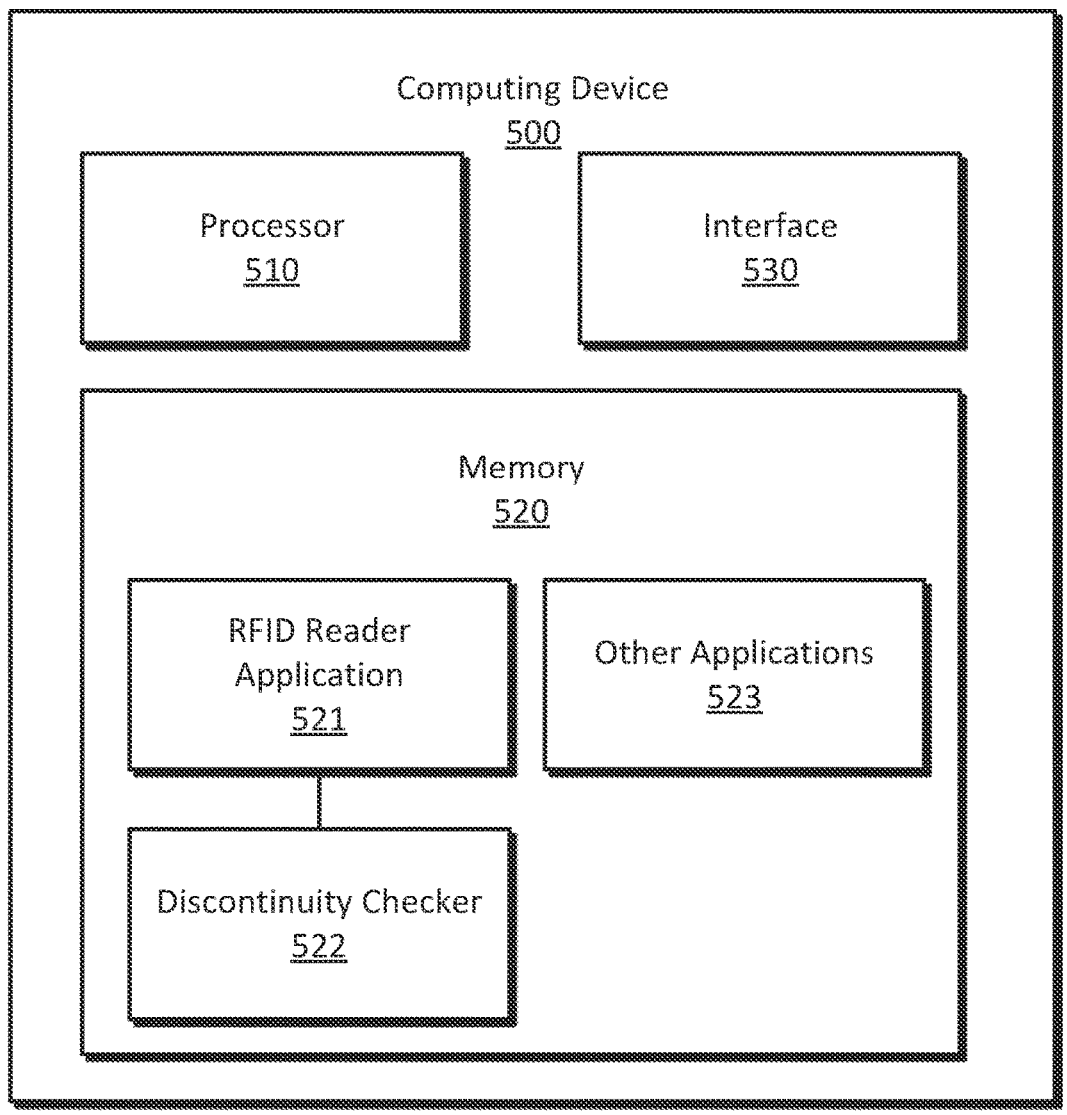
FIG. 5 illustrates a block diagram of a computing device according to aspects of the present disclosure.

FIG. 5 illustrates a block diagram of a computing device 500 that includes a processor 510, a memory 520, and an interface device 530, and may include other components such as additional storage, an input device, and an output device. The computing device 500 is generally under the control of an operating system (not shown). The processor 510 is included to be representative of a single CPU, multiple CPUs, a single CPU having multiple processing cores, and the like. The interface 530 may be any type of network communications device allowing the computing device 500 to communicate with other computers via a network, such as the Internet or a Local Area Network (LAN) via wireline or wireless communications. The interface 530 may also be any type of wireless signaling device, such as an antenna for energizing RFID tags and reading the resultant RFID signals.

The memory 520 may be a persistent or a volatile storage device. Although the memory 520 is shown as a single unit, the memory 520 may be a combination of fixed and/or removable non-transient computer readable memory storage devices, such as fixed disc drives, solid state drives, SAN storage, NAS storage, removable memory cards or optical storage. The memory 520 may be part of one virtual address space spanning multiple primary and secondary storage devices.

As shown, the memory 520 includes an RFID reader application 521, a discontinuity checker 522, and may include other applications 523 (including Operating Systems for the computing device 500). The RFID reader application 521 and discontinuity checker 522 may include instructions, that when performed by the processor 510, enable the computing device 500 to perform the operations described in the present application, including, but not limited to the operations described in relation to method 300 of FIG. 3 or method 400 of FIG. 4.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
    calculating a phase-time slope for a Radio Frequency Identifier (RFID) signal received from an RFID tag;
    estimating, based on the phase-time slope, a predicted phase reading for the RFID signal at a given time;
    in response to detecting a phase discontinuity based on a difference between the predicted phase reading and an actual phase reading for the given time, adjusting a calculated distance to the RFID tag; and
    in response to determining that the calculated distance indicates that the RFID tag is outside of a designated zone but within a proximity threshold of the designated zone, and that a motion of the RFID tag indicates travel towards the designated zone, adding an item associated with the RFID tag to an ongoing item list.

2. The method of claim 1, in response to determining that the calculated distance indicates that the RFID tag is inside of a designated zone, and that a motion of the RFID tag indicates travel away from the designated zone, removing an item associated with the RFID tag from an ongoing item list.

3. The method of claim 1, further comprising, in response to detecting the phase discontinuity:
    adjusting a running shift count by one of an increment or a decrement based on the phase-time slope.

4. The method of claim 3, wherein adjusting the calculated distance to the RFID tag further comprises calculating the RFID tag as approaching in response to determining one of that:
    the running shift count is negative; or
    the running shift count is zero and that a current phase reading of the RFID tag is less than an initial phase reading of the RFID tag.

5. The method of claim 3, wherein adjusting the calculated distance to the RFID tag further comprises calculating the RFID tag as moving away in response to determining one of that:
the running shift count is positive; or
the running shift count is zero and that a current phase reading of the RFID tag is greater than an initial phase reading of the RFID tag.

6. The method of claim 3, wherein the running shift count is maintained across a plurality of readings of the RFID tag.

7. A system, comprising:
a processor;
a memory including instructions that when executed by the processor enable the processor to perform operations comprising:
calculating a phase-time slope for a Radio Frequency Identifier (RFID) signal received from an RFID tag;
estimating, based on the phase-time slope, a predicted phase reading for the RFID signal at a given time;
in response to detecting a phase discontinuity based on a difference between the predicted phase reading and an actual phase reading for the given time, adjusting a calculated distance to the RFID tag; and
in response to determining that the calculated distance indicates that the RFID tag is inside of a designated zone, and that a motion of the RFID tag indicates travel away from the designated zone, removing an item associated with the RFID tag from an ongoing item list.

8. The system of claim 7, wherein the operations further comprise:
in response to determining that the calculated distance indicates that the RFID tag is outside of a designated zone but within a proximity threshold of the designated zone, and that a motion of the RFID tag indicates travel towards the designated zone, adding an item associated with the RFID tag to an ongoing item list.

9. The system of claim 7, wherein the operations further comprise, in response to detecting the phase discontinuity:
adjusting a running shift count by one of an increment or a decrement based on the phase-time slope.

10. The system of claim 9 wherein adjusting the calculated distance to the RFID tag further comprises calculating the RFID tag as approaching in response to determining one of that:
the running shift count is negative; or
the running shift count is zero and that a current phase reading of the RFID tag is less than an initial phase reading of the RFID tag.

11. The system of claim 9, wherein adjusting the calculated distance to the RFID tag further comprises calculating the RFID tag as moving away in response to determining one of that:
the running shift count is positive; or
the running shift count is zero and that a current phase reading of the RFID tag is greater than an initial phase reading of the RFID tag.

12. The system of claim 9, wherein the running shift count is maintained across a plurality of readings of the RFID tag.

13. A non-transitory computer-readable storage medium including instructions that when executed by a processor enable the processor to:
calculate a phase-time slope for a Radio Frequency Identifier (RFID) signal received from an RFID tag;
estimate, based on the phase-time slope, a predicted phase reading for the RFID signal at a given time; and
in response to detecting a phase discontinuity based on a difference between the predicted phase reading and an actual phase reading for the given time:
adjust a calculated distance to the RFID tag; and
adjust a running shift count by one of an increment or a decrement based on the phase-time slope.

14. The non-transitory computer-readable storage medium of claim 13, wherein the instructions further enable the processor to:
in response to determining that the calculated distance indicates that the RFID tag is outside of a designated zone but within a proximity threshold of the designated zone, and that a motion of the RFID tag indicates travel towards the designated zone, add an item associated with the RFID tag to an ongoing item list.

15. The non-transitory computer-readable storage medium of claim 13, wherein the instructions further enable the processor to:
in response to determining that the calculated distance indicates that the RFID tag is inside of a designated zone, and that a motion of the RFID tag indicates travel away from the designated zone, remove an item associated with the RFID tag from an ongoing item list.

16. The non-transitory computer-readable storage medium of claim 13, wherein adjusting the calculated distance to the RFID tag further comprises calculating the RFID tag as approaching in response to determining one of that:
the running shift count is negative; or
the running shift count is zero and that a current phase reading of the RFID tag is less than an initial phase reading of the RFID tag.

17. The non-transitory computer-readable storage medium of claim 13, wherein adjusting the calculated distance to the RFID tag further comprises calculating the RFID tag as moving away in response to determining one of that:
the running shift count is positive; or
the running shift count is zero and that a current phase reading of the RFID tag is greater than an initial phase reading of the RFID tag.

* * * * *